(12) United States Patent  
Parikh et al.

(10) Patent No.: US 8,849,438 B2  
(45) Date of Patent: Sep. 30, 2014

(54) FACTORY LEVEL PROCESS AND FINAL PRODUCT PERFORMANCE CONTROL SYSTEM

(75) Inventors: Suketu Arun Parikh, San Jose, CA (US); Alexander T. Schwarm, Austin, TX (US); Sanjiv Mittal, Fremont, CA (US); Charles Gay, Westlake Village, CA (US)

(73) Assignee: Applied Materials, Inc., Santa Clara, CA (US)

( * ) Notice: Subject to any disclaimer, the term of this patent is extended or adjusted under 35 U.S.C. 154(b) by 498 days.

(21) Appl. No.: 13/299,081

(22) Filed: Nov. 17, 2011

(65) Prior Publication Data

US 2012/0130520 A1 May 24, 2012

Related U.S. Application Data

(60) Provisional application No. 61/415,530, filed on Nov. 19, 2010.

(51) Int. Cl.

| | |
|---|---|
| *G06F 17/00* | (2006.01) |
| *G05B 13/02* | (2006.01) |
| *G06F 19/00* | (2011.01) |
| *G01N 37/00* | (2006.01) |
| *G06F 11/30* | (2006.01) |
| *G21C 17/00* | (2006.01) |
| *G06F 11/00* | (2006.01) |
| *G05B 19/418* | (2006.01) |

(52) U.S. Cl.
CPC ............................... *G05B 19/41875* (2013.01); *G05B 2219/32182* (2013.01)
USPC .................... 700/96; 700/33; 700/37; 700/52; 700/110; 702/82; 702/84; 702/185; 714/37; 714/47.2; 714/48

(58) Field of Classification Search
CPC .. G01R 31/01; G01R 31/2846; G05B 13/026; Y10S 131/908; Y10S 131/91; G07C 3/14
USPC ........... 700/28–30, 32, 33, 37, 51, 52, 95, 96, 700/108–110; 702/81–84, 182–185; 714/25, 26, 37, 46, 47.1, 47.2, 48, 57; 706/45–48, 54
See application file for complete search history.

(56) References Cited

U.S. PATENT DOCUMENTS

| 5,284,164 | A | * | 2/1994 | Andrews et al. ............... 131/280 |
| 5,327,437 | A | * | 7/1994 | Balzer ........................... 714/736 |

(Continued)

OTHER PUBLICATIONS

PCT International Search Report, for corresponding PCT Application No. PCT/US2011/061549, mailing date Jul. 9, 2012, 5 pages.

(Continued)

*Primary Examiner* — Crystal J Barnes-Bullock  
(74) *Attorney, Agent, or Firm* — Blakely, Sokoloff, Taylor & Zafman LLP

(57) ABSTRACT

A factory control server stores module configuration data for modules. The modules include processes for producing a final product and have corresponding module requirements. The factory control server analyzes in real-time actual product output data that is generated by a final product tester after a factory produces at least one final product to determine whether the actual product output data meets an expected product output. The factory control server analyzes actual module data in real-time to determine a new module requirement to cause new actual product output data for a subsequent final product to meet the expected product output in response to a determination that the actual product output data does not meet the expected product output. The factory control server notifies a module controller in real-time of the new module requirement. The module controller changes parameters in real-time to manufacture the subsequent final product.

18 Claims, 7 Drawing Sheets

(56) References Cited

U.S. PATENT DOCUMENTS

| | | |
|---|---|---|
| 6,370,437 B1 * | 4/2002 | Carter et al. .................. 700/52 |
| 6,434,440 B1 | 8/2002 | Teranishi et al. |
| 2003/0167238 A1 | 9/2003 | Zeif |
| 2004/0143352 A1 | 7/2004 | Gyorfi et al. |
| 2008/0021571 A1 | 1/2008 | Kokotov et al. |

OTHER PUBLICATIONS

PCT Written Opinion of the International Searching Authority, for corresponding PCT Application No. PCT/US2011/061549, mailing date Jul. 9, 2012, 4 pages.

PCT International Preliminary Report on Patentability, for corresponding PCT Application No. PCT/US2011/061549, mailing date May 30, 2013, 6 pages.

* cited by examiner

| Process | Inline Measurement | Co-Related Factory Parameter | Co-Related Process/Tool Parameter |
|---|---|---|---|
| Incoming Wafer | Life time (scan, 9 pt) | T bulk - $J_{SC}$, $V_{OC}$ Mechanical yield | Life time, thickness, u-cracks |
| Texture Etch | Reflectivity (WL), pyramid height | Reflectivity - $J_{SC}$ | Bath temp, chemistry concentration |
| POCL (Diffusion) / Deglaze (Etch) | Emitter OS, life time | Effective life time (Teff), emitter RS - $J_{SC}$, $V_{OC}$ | Furnace temp, time, flow |
| Nitride (Passivation) | Life time, reflectivity (WL), thickness | Reflectivity - $J_{SC}$ | Power, time, pressure |
| Al Metal (Back Metal) | Thickness, weight | | Pressure, spacing, speed |
| Ag Metal (Front Metal) | Thickness, width, weight | Line width - $J_{SC}$, FF | Screen life, squeege pressure, spacing, speed |
| Co-Fire/Isolation | Temp | Temp - FF | Zone temperature, belt speed |
| Final Test | Eta, $J_{SC}$, $V_{OC}$, FF (Rs, Rsh) | | |

FIG. 6

FACTORY LEVEL PROCESS AND FINAL PRODUCT PERFORMANCE CONTROL SYSTEM

RELATED APPLICATION

This application is related to and claims the benefit of U.S. Provisional Patent application Ser. No. 61/415,530, filed Nov. 19, 2010, which is hereby incorporated by reference.

TECHNICAL FIELD

Embodiments of the present invention relate to controlling a factory generally, and more particularly, to controlling manufacturing of a product at a factory level.

BACKGROUND OF THE INVENTION

Manufacturing processing systems generally comprise a plurality of distinct tools for performing certain process steps on a wafer (or other form of substrate). Additional tools comprise metrology stations that are used for testing wafers in-between process steps. Generally, the metrology testing is performed to determine the specific accuracy and efficacy of the processes conducted by a particular tool. Depending upon the results of the metrology testing, certain parameters of a particular tool may be adjusted to facilitate improving the function of the tool. In semiconductor manufacturing, current systems can provide intra-tool monitoring and control to provide both feed-forward and feedback data to control the tools based upon information that is gathered within the metrology station at specific instances in time or after. However, such process control in semiconductor manufacturing is limited to controlling only a subset of the processes involved in the manufacture of semiconductors. Conventional solutions do not provide automatic and dynamic overall performance control of an entire manufacturing process. In the solar industry, current solutions provide even more limited performance control. At best, manufacturing facilities for solar products are capable of only controlling one tool with metrology. Display technology manufacturing is limited to controlling only a subset of the processes involved in manufacture of display technology. Moreover, in light-emitting diode (LED) manufacturing, current solutions provide limited performance control due to the fact that only a subset of the tools required for LED manufacturing can be controlled with metrology.

In addition, typically, when a production line produces its first group of final products and measures for example, a yield for the final products that is not meeting expectations, the production line is shut down for analysis. Process engineers manually determine the cause for the low yield and which process parameters and/or tool parameters to change to improve the final product yield. This manual analysis can keep the production line shut down for days at a time. Conventional control systems do not provide an overall means to automatically monitor and adjust the target requirements of an entire manufacturing process to achieve optimum final performance.

BRIEF DESCRIPTION OF THE DRAWINGS

The present invention is illustrated by way of example, and not by way of limitation, in the figures of the accompanying drawings and in which:

FIG. 6 illustrates exemplary factory control data; and

DETAILED DESCRIPTION

Embodiments of the invention are directed to a method and system for controlling manufacturing of a product at a factory level. A factory control server stores module configuration data for a plurality of modules. The plurality of modules comprises processes for producing a final product and has corresponding module requirements. The factory control server analyzes in real-time actual product output data that is generated by a final product tester after a factory produces at least one final product to determine whether the actual product output data meets an expected product output. The factory control server analyzes actual module data in real-time to determine a new module requirement to cause new actual product output data for a subsequent final product to meet the expected product output in response to a determination that the actual product output data does not meet the expected product output. The factory control server notifies a module controller in real-time of the new module requirement, wherein the module controller changes parameters in real-time to manufacture the subsequent final product using the new module requirement, Current production control for manufacturing a product exists at two levels, a process/tool level and a module level. A module level controller can monitor a process and determine whether a tool needs to be adjusted to improve the performance of a process. The control of a module level controller, however, is limited to the scope of the module itself. In addition, typically when the performance characteristics of a final product fails to meet expectations (e.g., low yield), the production line is shut down and process engineers manually analyze data to determine how to change the production line parameters to improve the final product performance characteristics. Embodiments of the invention provide a factory level control system to monitor the performance characteristics of a final product in real-time and to automatically and dynamically adjust the performance of one or more modules in real-time to improve the performance characteristics of a final product. Real-time can include the time during execution of the processes for producing the final product.

Figure 1:
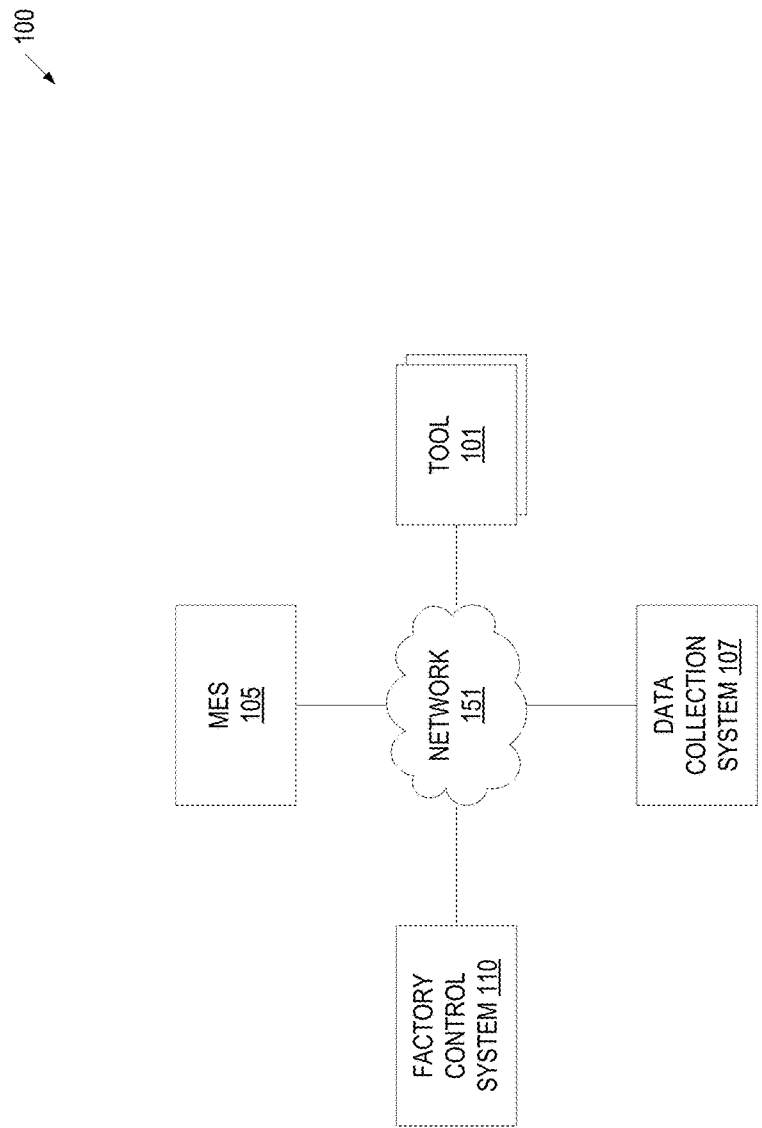
FIG. 1 illustrates an exemplary networking environment of a factory control system controlling creation of a product at a factory level.

FIG. 1 illustrates an exemplary network architecture 100 on which embodiments of the present invention can be implemented. The network architecture 100 can include processing tools 101, a manufacturing execution system (MES) 105, a data collection system 107, and a factory control system 110. A factory can be a factory to manufacture products, such as solar cells (e.g., crystalline Silicon, thin film amorphous Si, Thin film CIGS, CdTe, or 3-5 based), solar wafers, display technology such as LCDs, LEDs, batteries, or similar products which utilize a production line that operates for hours to produce the final product. A factory control system 110 can be coupled to the processing tools 101 for controlling production of a product at a factory level. A MES 105 can record all of the data for each production run (e.g., tool downtime, production output, etc.). A data collection system 107 can record all of the parameter data (e.g., process parameter data, tool parameter data, test parameter data, etc.) for a production line. One example of a data collection system 107 is an Applied E3™ server. One example of a MES 105 is an Applied SmartFactory™ system.

The MES 105, data collection system 107, and factory control system 105 can be individually hosted by one or more computing devices including server computers, desktop computers, laptop computers, handheld computers or similar computing devices. Alternatively, any combination of a MES 105, a data collection system 107, and a factory control system 105 can be hosted on one or more computing devices including server computers, desktop computers, laptop computers, handheld computers or similar computing devices. The MES 105, data collection system 107, factory control system 110, and process tools 101 can be maintained by a factory administrator.

The MES 105, data collection system 107, factory control system 105, and the process tools 101 can be coupled via a network 151 or directly via hardware interfaces (not shown). The network 151 can be a local area network (LAN), such as an intranet within a company, a wireless network, a mobile communications network, a wide area network (WAN), such as the Internet or similar communication system. The network 151 can include any number of networking and computing devices such as wired and wireless devices.

Examples of the processing tools 101 include, and are not limited to, incoming wafer quality tools, texturing tools, diffusion tools, etchers, nitride (passivation) tools, cleaning tools, back metal tools, front metal tools, firing tools, isolation tools, testing tools, measurements tools, etc. for the manufacture of solar cells, solar wafers, displays such as LCDs, LEDs, batteries, or of a type for manufacturing other products which include a production time of hours to produce a final product.

The factory control system 110 can receive product output data for a final product (e.g., solar cell, solar wafer, solar thin film, display, LED) manufactured by the tools 101 that indicates the performance characteristics (e.g., cell efficiency, yield, distribution) of the final product. The factory control system 110 can receive product output data from a final product tester. The factory control system 110 can determine whether the performance characteristics meet expected performance characteristics and can automatically and dynamically adjust the modules from a factory level when the performance characteristics do not meet the expected performance characteristics. The factory control system 110 can manage module level controllers to automatically and dynamically adjust the production of the final product.

Figure 2:
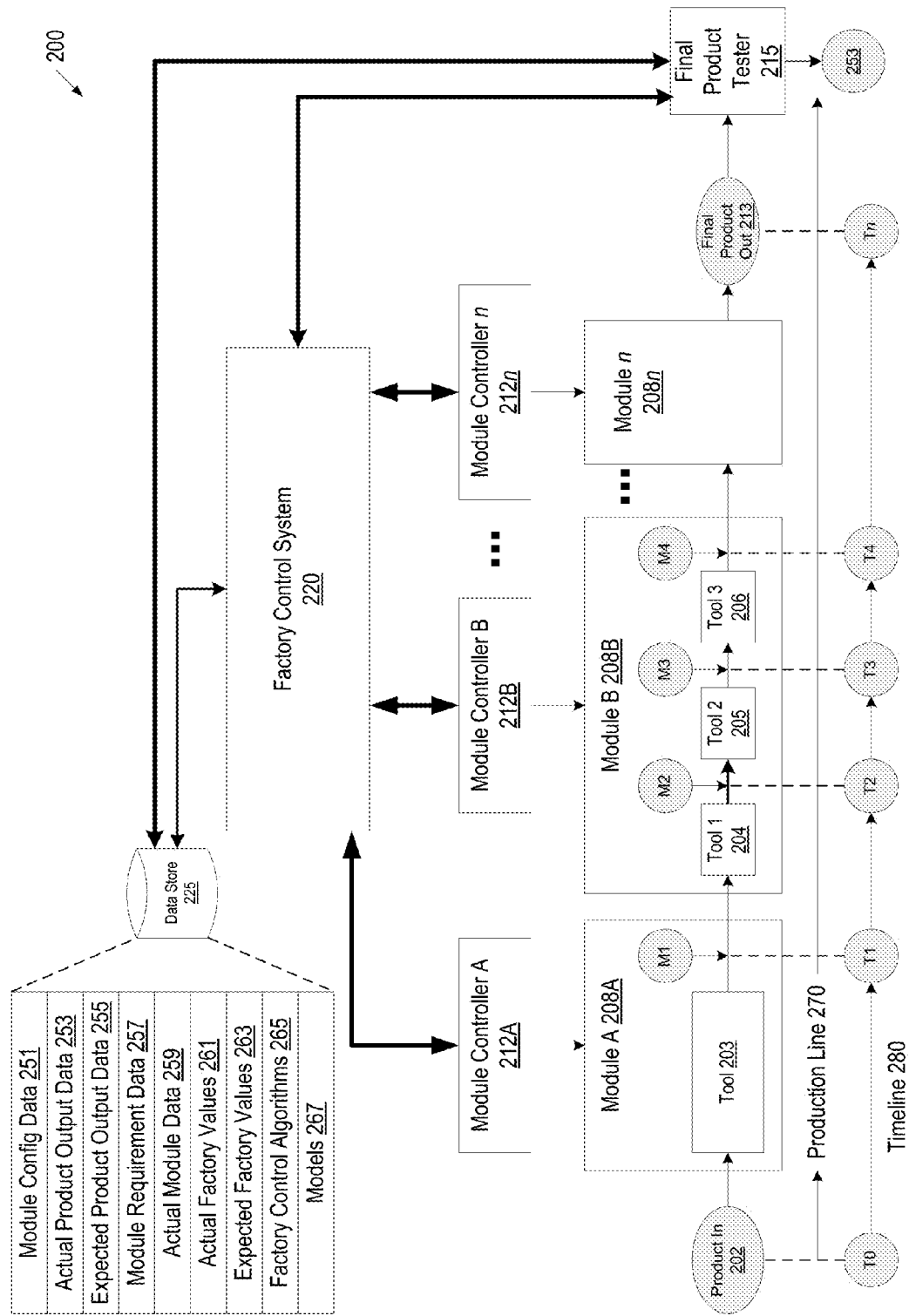
FIG. 2 is a block diagram illustrating a factory control system for controlling creation of a product at a factory level, according to one embodiment of the invention.

FIG. 2 is a block diagram 200 illustrating a factory control system 220 for controlling creation of a product at a factory level. In one embodiment, the factory control system 200 is hosted by a computing device as described in conjunction with FIG. 1. A production line 270 can include a number of processes. For instance, examples of a production line 270 to produce a solar cell (final product out 213) can include, and are not limited to, the following processes: incoming wafer quality, texturing, diffusion and etching, passivation, back metal, front metal, firing, and testing. A process can include process parameters and one or more process tools (e.g., tools 203-206). Process tools can have associated tool parameters (e.g., temperature, pressure, flow rate, etc.).

The processes and process tools to manufacture a product out 213 can be grouped into one or more modules 208A-n. For example, a solar cell production line can have four modules, such as an incoming wafer quality module 208A, an emitter RS module 208B, a passivation quality module, and a print quality/fill factor module. The factory control system 220 can be coupled to a data store 225 that stores module configuration data 251 that specifies which processes and process tools belong to a module. For example, module configuration data 251 can define that the incoming wafer quality module 208A includes an incoming wafer quality process and tool 203. In another example, module configuration data 251 can define that the emitter RS module 208B includes a texturing process and tool 204, a diffusion process and tool 205, a cleaning process and tool 206. The module configuration data 251 can be user-defined data. For example, a process engineer can provide user input of the module configuration data 251 via a user interface, such as a graphical user interface (GUI).

A module 208A-n can include one or more measurement tools to make inline measurements, for example, at M1-M4. One example of a measurement tool is a metrology station. Examples of inline measurements can include, and are not limited to, life time, reflectivity, pyramid height, emitter Rs, thickness, width, temperature, etc. For example, a measurement tool can measure life time at M1. Another measurement tool can measure emitter RS at M2. A final tester 215 can collect the inline measurements from the measurement tools (e.g., M1-M4) and can store the data as part of actual module data 259 in the data store 225.

Each inline measurement made by a measurement tool can have corresponding expected values, also herein referred to as 'module parameter requirements,' and 'module requirement(s)'. For example, the module requirements for the module 208B (e.g., emitter RS module) can be life time between 10-20 µs, emitter RS between 55-65Ω, and reflectivity between 15-18%. The module requirements can be user-defined requirements. For example, a process engineer can provide user input of the module requirements via a user interface, such as a GUI. The module requirements can be stored as module requirement data 257 in the data store 225.

A module 208A-n can have a corresponding module controller 212A-n for controlling process parameters and tool parameters at a module level to achieve the module requirement for the corresponding module. A tool (e.g., tools 204-206) can have a corresponding tool controller (not shown) to set and/or change the tool parameters. A tool controller can monitor the tool parameters in real-time. The final tester 215 can collect the real-time tool parameter data from the tool controllers and can store it as part of actual module data 259 in the data store 225. A module controller (e.g., module controller 212A-n) can cause a tool controller to change the tool parameters to achieve a new module requirement. The process parameters and tool parameters can be changed in real-time. For example, the emitter RS module 208B has module controller 212B, which can cause a tool controller to set the temperature for a process tool 204 at 380 degrees to achieve the module output requirement for emitter RS to be between 55-65Ω. One embodiment of a method for adjusting a production line at a factory level in real-time to achieve the expected final product performance characteristics is described in greater detail in conjunction with FIG. 5. A module level controller 208A-n can measure and control processes as well as feedback information to the factory control system 220. A module level controller 208A-n can be part of specific metrology and control systems for specific processes, and thus, limited to the scope of the specific processes. For example, a print quality module controller can measure print width, height, as well as control print parameters (e.g., squeeze pressure, screen life, speed, spacing, etc.).

The final product tester 215 can determine actual product output data 253 for the final product out 213 in real-time as the final product is produced. The product output data is an indication of final product performance characteristics. Examples of product output data can include, and are not limited to, efficiency (e.g., cell efficiency), yield, distribution, etc. For example, the production line 270 begins to process a first product in 202 or first group of products in 202 at Time 0 (e.g., T0 at timeline 280). At $T_n$ (e.g., three hours later), the production line 270 produces its first product out 213 or first group of first product out 213. When the production line produces a final product 213 (e.g., a solar cell, solar wafer, solar thin film, display, LED, etc.) or a group of final products 213 (e.g., group of solar cells, a group of solar wafer, a group of solar thin films, a group of displays, a group of LEDs, etc.), a final product tester 215 can test a final product for performance characteristics (e.g., cell efficiency, yield, distribution). The final product tester 215 can store the actual product output data 253 in a data store 225 that is coupled to the final product tester 215. The final product tester 215 can continuously determine the actual product output data 253 for each final product out 213 as it is produced.

Product performance characteristics can be a function of one or more factory parameters. For example, cell efficiency is a function of short circuit current ($J_{SC}$), open circuit voltage ($V_{OC}$), and resistance (Rseries, Rshunt) also known as fill factor (FF). The final product tester 215 can test each final product out 213 for actual factory parameter values 261. Examples of factory parameters can include, and are not limited to, $J_{SC}$, $V_{OC}$, Rseries, Rshunt, FF, incoming wafer quality, etc. The final product tester 215 stores the actual factory parameter values 261 in the data store 225.

The data store 225 can store expected product output data 255. Examples of the expected product output data 255 can include, and are not limited to, expected cell efficiency, expected yield, expected distribution, etc. An expected value can be a value range, threshold, etc. For example, the expected product output for cell efficiency can be 16.5-17%. The expected product output data 255 can be user-defined. For example, a process engineer can provide the expected product output data 255 via a user interface, such as a GUI.

The data store 225 can store expected factory parameter values 263 (expected factory value). Examples of the expected factory values 263 can include, and are not limited to, expected values for $J_{SC}$, $V_{OC}$, Rseries, Rshunt, FF, incoming wafer quality, etc. An expected value can be a value range, threshold, etc. For example, the expected factory value for $J_{SC}$ can be 35 A. The expected factory values 263 can be user-defined. For example, a process engineer can provide the expected factory values 263 via a user interface, such as a GUI.

The factory control system 220 can access the actual product output data 253 (e.g., cell efficiency) for a final product out 213 (e.g., a first group of solar cells produced by the production line) and determine whether the actual product output data 253 meets the expected product output 255. For example, the actual product output data 253 is compared to the expected product output 255 and a determination is made if the actual product output data 253 falls within a range of or matches the expected product output 255. When the actual product output data 253 (e.g., cell efficiency) does not meet the expected product output 255, the factory control system 220 can determine a new module requirement for one or more modules 208A-n to cause the actual product output data for a subsequent final product to meet the expected product output 255. One embodiment for determining a new module requirement for a module to cause the actual product output value for a subsequent final product to meet the expected product output value is described in greater detail in conjunction with FIG. 4.

For example, the factory control system 220 can determine that the actual product output data 253, cell efficiency, for a first group of solar cells is 16%, which does not meet the expected product output 255 for cell efficiency of 16.5-17%. The factory control system 220 can use factory control algorithms 265 and models 267 that are stored in the data store 225 to determine a new module requirement for one or more modules 208A-n to cause the actual product output data for a subsequent final product 213 to meet the expected product output 255.

The factory control algorithms 265 can correlate expected product output 255 (e.g., cell efficiency) to one or more module parameter requirements 257. For example, the module requirement 257 for the emitter RS module 208B is a life time between 10-20 µs, an emitter RS between 55-65Ω, and a reflectivity between 15-18%. These module requirements 257 for the emitter RS module 208B can correspond to cell efficiency between 16.5-17%. That is, when the emitter RS module 208B does not meet one of its module requirements 257 (e.g., actual emitter RS is 50Ω), the cell efficiency can be affected (e.g., cell efficiency drops out of the expected range). Examples of models 267 can include, and are not limited to, models to simulate module performance, process performance, tool performance, etc. The models 267 can be user-defined. For example, a process engineer can provide the models 267 via a user interface, such as a GUI. One embodiment of a method for using factory control algorithms and models to determine a new module requirement from a factory level is described in greater detail below in conjunction with FIG. 5.

The factory control system 220 can automatically and dynamically adjust the module requirements 257 for one or more modules 208A-n to try to have subsequent final product performance characteristics achieve the expected product output 255. In one embodiment, when the factory control system 220 determines a new module requirement, it can send a message in real-time to a module controller 212A-n to set/change the process parameters and tool parameters for a module to achieve the new module requirement 257. The module controller can cause a tool controller to change the parameters in real-time, such that the production line can immediately process wafers according to the changed tool parameters. For example, the factory control system 220 can determine that the new module requirement for the emitter RS module 208B is a life time between 12-20 µs and an emitter RS between 60-65Ω and send a message in real-time to the emitter RS module controller 212B to cause the process parameters and tool parameters to be changed to achieve these new module requirements. Once the change is implemented, wafers can be processed under the changed parameters. In another embodiment, the factory control system 220 itself can communicate with a tool controller to change the tool parameters to achieve the new module requirement.

Figure 3:
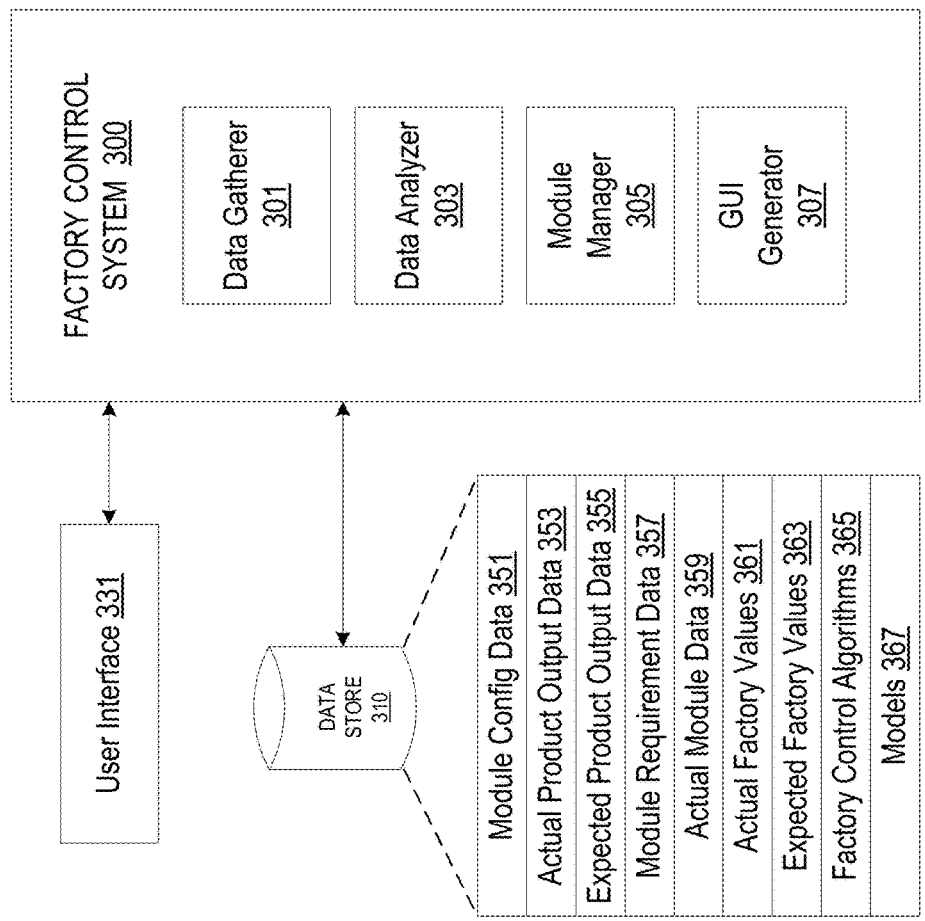
FIG. 3 is a block diagram illustrating a factory control system, according to one embodiment of the invention.

FIG. 3 is a block diagram illustrating a factory control system 300 for controlling creation of a product at a factory level. In one embodiment, the factory control system 300 is hosted by one or more computing devices as described in conjunction with FIG. 1. The factory control system 300 can include a data gatherer 301, a data analyzer 303, a module manager 305, and a graphical user interface (GUI) generator 307.

The GUI generator 307 can generate a user interface 331 to receive user input. The user interface can be a graphical user interface. The factory control system 300 can be coupled to a data store 310 to store data (e.g., module configuration data 351, actual product output data 353, expected product output data 355, module requirement data 357, actual module data 359, actual factory values 361, expected factory values 363, factory control algorithms 365, and models 367). Some of the data can be user-defined (e.g., expected product output data 355, expected factory values 363, factory control algorithms 365, models 367). For example, a process engineer can provide the data via a user interface 331.

The data store 310 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items The data store 310 can store module configuration data 351 that specifies which processes and process tools belong to a module. For example, module configuration data 351 can define an emitter RS module that includes a texturing process and texturing tool, a diffusion process and diffusion tool, a cleaning process and cleaning tool.

The data store 310 can store the actual product output data 353 generated by a final product tester for a final product and the expected product output data 355 as defined by a user. Product output data is an indication of final product performance characteristics. Examples of product output data can include, and are not limited to, efficiency (e.g., cell efficiency), yield, distribution, etc.

The data store 310 can store module requirement data 357 and actual module data 359. A module (e.g., emitter RS module) can include one or more measurement tools to make inline measurements. One example of a measurement tool is a metrology station. Examples of inline measurements can include, and are not limited to, life time, reflectivity, pyramid height, emitter Rs, thickness, width, temperature, etc. Table 1 illustrates exemplary inline measurements for various solar cell processes. For example, a measurement tool can measure life time during an incoming wafer quality process. The inline measurements from the measurement tools can be stored as actual module data 359 in the data store 310.

TABLE 1

| Process | Module Inline Measurement |
|---|---|
| Incoming wafer quality | Life time, wafer thickness, u-crack |
| Texture, etch | Reflectivity, Pyramid height |
| POCL (Diffusion)/Deglaze (Etch) | Emitter Rs, life time |
| Nitride (Passivation) | Life time, reflectivity |
| Al Metal (Back Metal) | Thickness, weight |
| Ag Metal (Front Metal) | Thickness, width, weight |
| Co-Fire/Isolation | Temperature |
| Tester | Cell Efficiency, JSC, VOC, FF |

Table 2 illustrates exemplary inline measurements for various solar wafer fabrication processes. For example, a measurement tool can measure glass thickness and cracks during an incoming glass inspection process. The inline measurements from the measurement tools can be stored as actual module data 359 in the data store 310.

TABLE 2

| Process | Module Inline Measurement |
|---|---|
| Wafering line quality | Life time, wafer thickness, u-crack, dislocation |
| Casting of ingot | Material |
| Brick cutting | Life time, wafer thickness, u-crack, dislocation |

TABLE 2-continued

| Process | Module Inline Measurement |
|---|---|
| Wafer quality | Life time, wafer thickness, u-crack |
| Binning | Life time, wafer thickness, u-crack, dislocation |

Table 3 illustrates exemplary inline measurements for various display fabrication processes. For example, a measurement tool can measure glass thickness and cracks during an incoming glass inspection process. The inline measurements from the measurement tools can be stored as actual module data 359 in the data store 310.

TABLE 3

| Process | Module Inline Measurement |
|---|---|
| Glass inspection | Glass thickness, crack |
| Ta Dep | Pattern |
| Gate Oxide dep/a-Si Dep | Thickness, Particles measure |
| Source Drain Contact | Metal dep. pattern |
| Top electrode/LCD layer/Bottom layer | Thickness, width, weight |
| RGY color filters | Color |
| Tester | Display pixel yield |

Table 4 illustrates exemplary inline measurements for various LED fabrication processes. For example, a measurement tool can measure metrology thickness, RI, and quality during an incoming MQW layer test process. The inline measurements from the measurement tools can be stored as actual module data 359 in the data store 310.

TABLE 4

| Process | Module Inline Measurement |
|---|---|
| Saphire/Si substrate | Thickness, crack |
| nGaN layer | Metrology thickness, RI, quality |
| MQW layer | Metrology thickness, RI, quality |
| pGaN layer | Metrology thickness, RI, quality |
| Metal contact | Metal dep |
| Pattern | Pattern |
| Yield testing | Wavelength uniformity, die yield |

Table 5 illustrates exemplary inline measurements for various thin film solar technology fabrication processes. For example, a measurement tool can measure glass thickness and cracks during an incoming glass inspection process. The inline measurements from the measurement tools can be stored as actual module data 359 in the data store 310.

TABLE 5

| Process | Module Inline Measurement |
|---|---|
| Glass inspection | Glass thickness, crack |
| Bottom metal electrode | Thickness, composition, life time, material/grain size |
| A-si layer/CIGS layer/Cd—Te layer | Thickness, composition, life time, material/grain size |
| Top ITO layer | Thickness, composition, life time, material/grain size |
| Metal pattern | Pattern |
| Solar cell | Efficiency |

Module requirement data 357 can define the expected values for the inline measurements. For example, the module requirements for the emitter RS module can be a life time between 10-20 μs, an emitter RS between 55-65Ω, and a reflectivity between 15-18%. The module requirements can be stored as module requirement data 357 in the data store 310.

The data store 310 can store actual factory parameter values 361 and expected factory parameter values 363. Product output performance characteristics (e.g., cell efficiency, yield, distribution, etc.) can be a function of one or more factory parameters. For example, cell efficiency is a function of short circuit current ($J_{SC}$), open circuit voltage ($V_{OC}$), and resistance (Rseries, Rshunt), also known as fill factor (FF). A final product tester (not shown) can test each final product for actual factory parameter values 361. Examples of factory parameters can include, and are not limited to, $J_{SC}$, $V_{OC}$, Rseries, Rshunt, FF, incoming wafer quality, etc. The expected factory parameter values 363 can be user-defined. For example, a process engineer can provide the expected factory parameter values 363 via a user interface 331. Examples of the expected factory parameter values 363 can include, and are not limited to, the expected values for $J_{SC}$, $V_{OC}$, Rseries, Rshunt, FF, incoming wafer quality, etc. An expected value can be a value range, threshold, etc. For example, the expected factory value for $J_{SC}$ can be 35 A.

The data gatherer 301 can obtain data from the data store 310 and/or a final product tester (not shown) that is coupled to the factory control system 300. The data gatherer 301 can detect the execution of a production line to manufacture a product (e.g., solar cell, solar wafer, solar thin film, display, LED) and monitor for actual product output data 353. In one embodiment, data is stored in a data collector server (e.g., an E3 server) that resides in the factory. The factory control system 300 can be coupled to the data collector server and the data gatherer 301 can obtain data from the data collector server.

When actual product output data 353 is available, the data analyzer 303 can determine whether the actual product output data 353 meets the expected product output 355. When the actual product output data 353 (e.g., cell efficiency) does not meet the expected product output 355, the data analyzer 303 can use factory control algorithms 365 and models 367 to determine a new module requirement for one or more modules to cause a new actual product output data (e.g., the actual product output data for subsequent final products) to meet the expected product output 355.

The data store 310 can store factory control algorithms 365, which include data that correlates expected product output 355 (e.g., cell efficiency) to one or more expected factory values 363. For example, the factory control algorithms 365 can indicate that expected cell efficiency corresponds to the expected values for $J_{SC}$, $V_{OC}$, and FF.

The data analyzer 303 can use the factory control algorithms 365 to identify which of the actual factory parameter values 361 does not meet the expected factory parameter values 363. For example, if the actual cell efficiency measures 16% and the expected range of cell efficiency is between 16.5-17%, the data analyzer can determine that the cell efficiency is out of range. The data analyzer 303 can then determine from the factory control algorithms 365 that cell efficiency is a function of $J_{SC}$, $V_{OC}$, and FF. The data analyzer 303 examines the actual factory values 361 for $J_{SC}$, $V_{OC}$, and FF and compares the actual factory values 361 to the expected factory values 363. The data analyzer 303 may determine that the actual value for $J_{SC}$ is 34 A, which does not meet the expected $J_{SC}$ of 35 A. In another example, the data analyzer 303 may determine that the actual value for $V_{OC}$ is 590V which does not meet the expected $V_{OC}$ of 610V.

The data analyzer 303 can use the information that the actual values for $J_{SC}$ and $V_{OC}$ do not meet the expected factory values (the identified actual factory values that do not meet the expected factory values) to determine which modules to evaluate. The factory control algorithms 365 can also include data that correlates an expected factory value 363 (e.g., $J_{SC}$, $V_{OC}$, FF) to one or more module inline requirements 357 and modules. For example, the factory control algorithms 365 may indicate that $J_{SC}$ corresponds to emitter RS and line width and height. The factory control algorithms 365 can further correlate the emitter RS inline measurement to the emitter RS module, and the line width and height inline measurements to the print quality module. Table 2 below illustrates exemplary factory control algorithm data correlating factory parameters to module inline measurements and modules.

TABLE 6

| Module(s) | Module Inline Measurement(s) | Factory Parameter(s) |
|---|---|---|
| Emitter RS | Emitter RS | $J_{SC}$, Rseries |
| Emitter RS, Passivation | Life time | $V_{OC}$ |
| Print Quality, FF | Line Width, Height | $J_{SC}$, Rseries |
| Print Quality, FF | Firing Temperature | FF (Rseries, Rshunt) |
| Wafer quality | Life time, U-cracks, Wafer thickness | $V_{OC}$, $J_{SC}$, Mechanical Yield |

The data analyzer 303 can use the factory control algorithms 365 to identify which modules (e.g., emitter RS module, print quality module) to further evaluate.

The data analyzer 303 can use models 367 to simulate performance of the identified modules. Examples of models 367 can include, and are not limited to, models to simulate module performance, process performance, tool performance, etc. The models 367 can be user-defined. During simulation, the data analyzer 303 can adjust the module requirements, for example, for the emitter RS module and the print quality module, to predict whether a final product will have product output data (e.g., cell efficiency) that meets the expected product output under the adjusted (new) module requirements. The data analyzer 303 can determine a new module requirement for one or more modules based on the modeling results. For example, the data analyzer 303 determines a new module requirement for the emitter RS module will be 60-65Ω instead of 55-65Ω. The new module requirement can be stored in module requirement data 357.

The module manager 305 can notify a module controller in real-time to meet the new module requirements. In one embodiment, the module controller can cause a tool controller to change process parameters and/or tool parameters to meet a new module requirement. The process parameters and/or tool parameters can be changed in real-time. In another embodiment, the module manager 305 itself can communicate with a tool controller to change process parameters and/or tool parameters for a module to meet a new module requirement.

Figure 4:
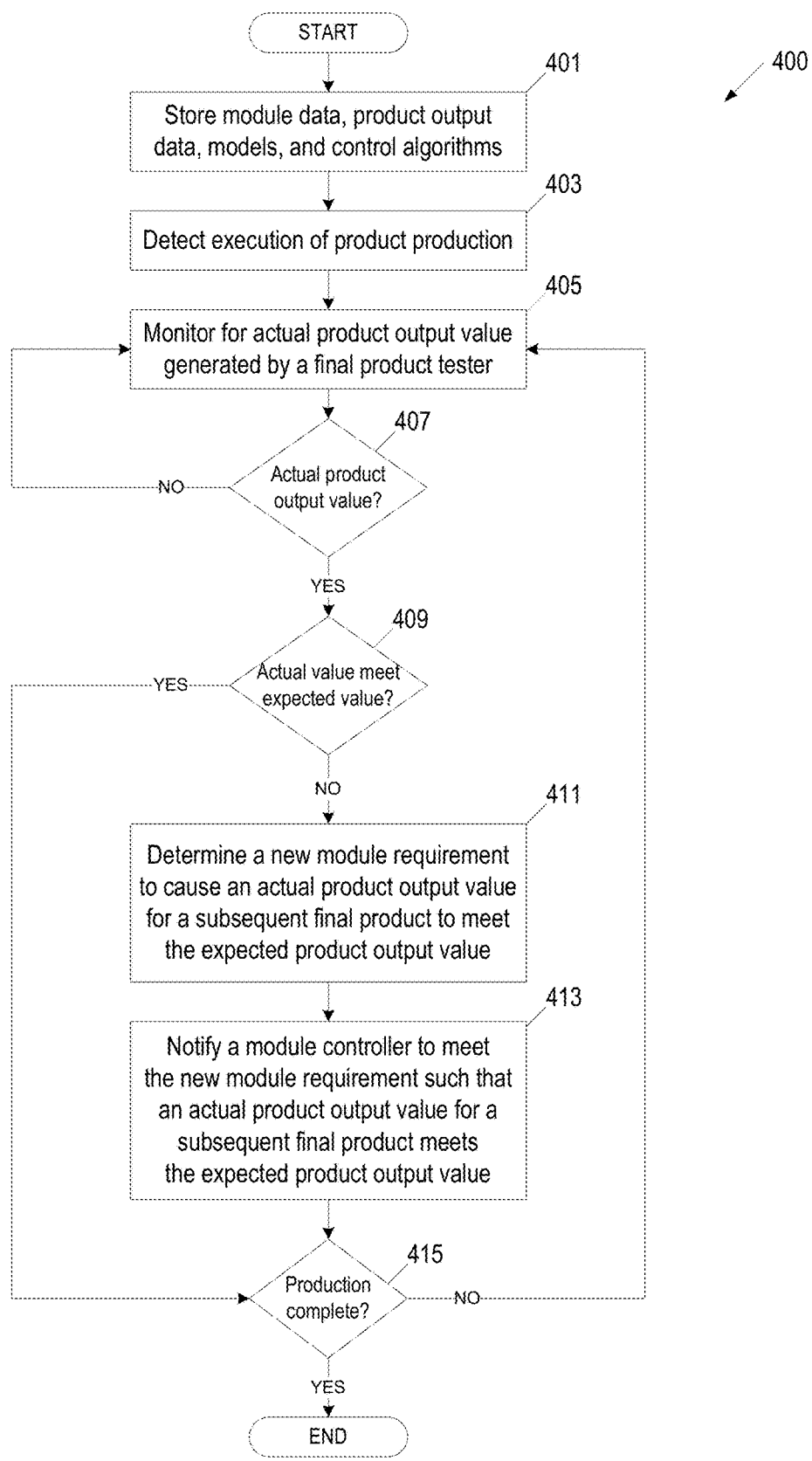
FIG. 4 is a flowchart which illustrates an embodiment of a method for controlling creation of a product at a factory level.

FIG. 4 is a flowchart which illustrates an embodiment of a method 400 for controlling creation of a product at a factory level. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the factory control system 110 of FIG. 1.

At block 401, the factory control system stores module data, product output data, models, and factory control algorithm data. Module data can include module configuration data, module requirement data, and actual module data. The processes and process tools in a production line to manufacture a final product can be grouped into one or more modules. Module configuration data can be user-defined data that specifies which processes and process tools belong to a module. For example, module configuration data can define that an emitter RS module includes a texturing process and texturing tool, a diffusion process and diffusion tool, and a cleaning process and cleaning tool. A module has a corresponding module requirement. Module requirement data specifies the expected inline measurement values for a module. For example, the module requirement for an emitter RS module can be an emitter RS to measure between 55-65Ω, a life time to measure between 10-20 µs, and a reflectivity to measure between be 15-18%. Actual module data includes the actual inline measurement values as taken by one or more measurements tools, or collected or measure by a final tester.

Product output data can include actual product output data and expected product output. Product output data is data representing performance characteristics of a final product (e.g., solar cell, solar wafer, solar thin film, display, LED) that is produced by the production line. Examples of product output data can include, and are not limited to, efficiency (e.g., cell efficiency), yield, distribution, etc. A final tester can test a final product (e.g., solar cell, solar wafer, solar thin film, display, LED) to determine actual product output data for the final product. The final tester can store the actual product output data in a data store that is coupled to the final tester and the factory control system. Expected product output data can be user-defined. For example, a process engineer can provide the expected values for one or more product outputs (e.g., efficiency, yield, distribution).

Models can simulate performance of modules. Examples of models can include, and are not limited to, models to simulate module performance, process performance, tool performance, etc. The models can be user-defined.

Factory control algorithm data can correlate expected product output (e.g., cell efficiency) to one or more module parameter requirements. For example, the module requirement for an emitter RS module is a life time between 10-20 µs, an emitter RS between 55-65Ω, and a reflectivity between 15-18%. These module requirements for the emitter RS module can correspond to cell efficiency between 16.5-17%. That is, when the emitter RS module does not meet one of its module requirements (e.g., actual emitter RS is 50Ω), the cell efficiency can be affected (e.g., cell efficiency drops out of the expected range).

At block 403, the factory control system detects the beginning of product processing. For example, the production line receives a first wafer in or a first group of wafers in and begins processing the wafer(s). At block 405, the factory control system monitors for actual product output data. When the production line produces a final product (e.g., a solar cell that is produced three hours after production started) or a group of final products, a final product tester can test a final product for one or more actual product output data (e.g., cell efficiency, yield, distribution, etc.). The tester can store the actual product output data in the data store.

If there is not actual product output data yet generated (block 407), the factory control system returns to block 405 to continue monitoring for actual product output data. If there is actual product output data (block 407), the factory control system receives the actual product output data for a final product and determines whether the actual product output data (e.g., cell efficiency) meets expected product output at block 409. The factory control system can perform statistical analysis on the actual product output data for a number of final products to make the determination of whether, for example, an average actual product output data meets the expected product output.

If the actual product output data (e.g., cell efficiency) meets the expected product output (block 409), the factory control system can determine whether the production line is finished running at block 415. If the actual product output data (e.g., cell efficiency) does not meet the expected product output (block 409), the factory control system determines a new module requirement for one or more modules to cause actual product output data for a subsequent final product to meet the expected product output at block 411. One embodiment of a method for adjusting a production line at a factory level in real-time to achieve the expected final product performance characteristics is described in greater detail in conjunction with FIG. 5.

At block 413, the factory control system causes a module to meet the new module requirements. The factory control system can notify a module controller of the new module requirement. In one embodiment, the module controller changes process parameters and/or tool parameters to meet its new module requirement. In another embodiment, the factory control system itself can change process parameters and/or tool parameters to meet the new module requirement. The process parameters and/or tool parameters can be changed in real-time to meet a new module requirement. One embodiment of a method for adjusting process parameters and/or tool parameters in real-time from a factory level is described in greater detail below in conjunction with FIG. 5.

If production is not finished (block 415), the factory control system can return to block 405 to monitor for actual product output data for a subsequent final product and determine whether a subsequent final product that is manufactured under the new module requirement meets the expected product output at block 409. If production is finished (block 415), the method 400 ends.

Figure 5:
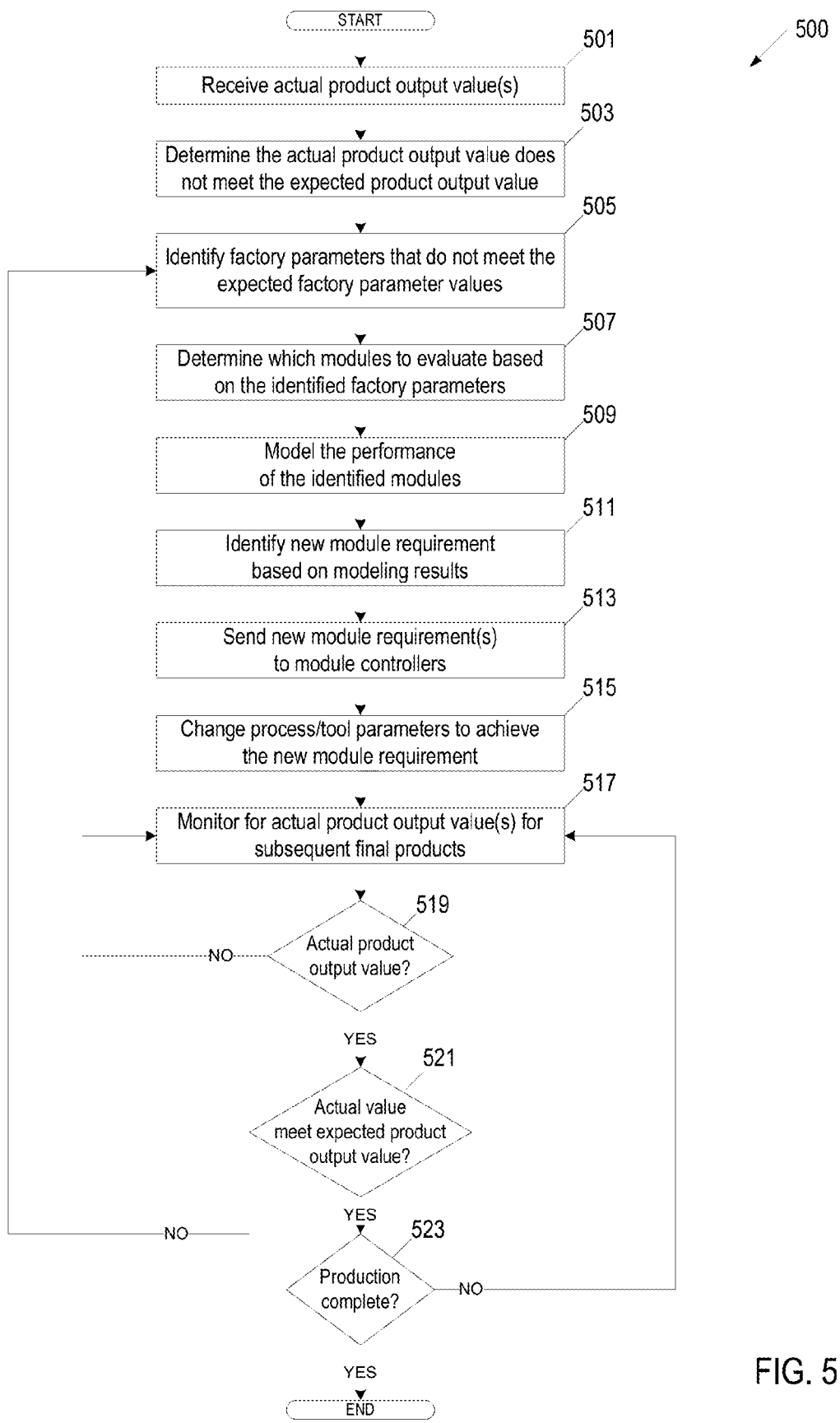
FIG. 5 is a flowchart which illustrates an embodiment of a method for controlling creation of a product at a factory level.

FIG. 5 is a flowchart which illustrates an embodiment of a method 500 for controlling creation of a product at a factory level. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed the factory control system 110 of FIG. 1.

A final product tester can test each final product (e.g., solar cell, solar wafer, solar thin film, display, LED) for product output performance characteristics. Examples of product output performance characteristics can include, and are not limited to, efficiency (e.g., cell efficiency), yield, distribution, etc. Product output performance characteristics can be a function of one or more factory parameters. For example, cell efficiency is a function of short circuit current ($J_{SC}$), open circuit voltage ($V_{OC}$), and resistance (Rseries, Rshunt), also known as fill factor (FF). The final product tester can test each final product for factory parameters. Examples of factory parameters can include, and are not limited to, $J_{SC}$, $V_{OC}$, Rseries, Rshunt, FF, incoming wafer quality, etc. The final product tester stores the test results, such as the actual product output data and the actual factory parameter values, in a data store that is coupled to the final product tester.

At block 501, the factory control system continually accesses actual product output data (e.g., cell efficiency) for final products which the production line produces. For example, the factory control system can access actual product output data periodically (e.g., every five minutes) or as it is generated by a final product tester. Accessing the current actual product output data can help ensure the method 500 uses the most recent data reflecting a more accurate representation a final product's performance characteristics, which in turn can be indicative of module behavior, process behavior, and tool behavior.

At block 503, the factory control system determines that the actual product output data does not meet expected product output. The factory control system can perform statistical analysis and apply factory control algorithms stored in a data store that is coupled to the factory control system to make this determination. For example, the factory control system can evaluate an average of the actual product output data for a number of final products over a period of time and determine that the average does not meet the expected product output as specified in a factory control algorithm.

Product output performance characteristics (e.g., cell efficiency) are a function of one or more factory parameters. At block 505, the factory control system identifies which factory parameters (e.g., $J_{SC}$, $V_{OC}$, FF, Rseries, Rshunt) do not meet the expected factory parameters, thus possibly causing the actual product output data (e.g., cell efficiency) to not meet the expected product output. For example, the actual cell efficiency may be 15.5% which does not meet the expected cell efficiency of 16.5-17%. Cell efficiency is a function of $J_{SC}$, $V_{OC}$, and FF. The factory control system accesses the actual factory parameter values (e.g., generated by the final tester) and compares the actual factory parameter values to the expected factory parameter values that are stored in the data store. For example, the factory control system determines that the actual $J_{SC}$ is 34.5 A and does not meet the expected $J_{SC}$ of 35 A for a given wafer quality (life time). Note each wafer will have a slightly different target based on its initial wafer quality which the controller tries to maximize.

At block 507, the factory control system identifies which modules to evaluate based on the identified actual factory parameter values which do not meet the expected factory parameter values and based on factory control algorithms stored in the data store. Factory controlled algorithm data can be user-defined data that correlates factory parameters (e.g., $J_{SC}$, $V_{OC}$, FF, Rseries, Rshunt) with module inline measurements and modules. For example, the factory control system determines that the actual $J_{SC}$ is 34.5 A and does not meet the expected $J_{SC}$ of 35 A. The factory control system determines that the factory parameter, $J_{SC}$, correlates to module inline measurements emitter RS, line width, and height. The module inline measurement emitter RS correlates to the emitter RS module. The module inline measurements line width and height correspond to the print quality/FF module. The factory control system identifies the emitter RS module and the print quality/FF module as the modules to evaluate.

At block 509, the factory control system models the performance of the identified modules (e.g., emitter RS module, print quality/FF module) to predict the final performance characteristics (e.g., cell efficiency) of a simulated final product. The factory control system can apply process models, module models, tool models, etc. that are stored in a data store that is coupled to the factory control system to model the performance of the identified modules. The models can be user-defined models. The factory control system can populate a model with current factory data (e.g., current module requirements, current process parameters, current tool parameters, etc., for example, collect by a data collection system) to simulate the performance of one or more modules and simulate the final performance characteristics (e.g., cell efficiency) of a final product. During modeling, the factory control system can adjust the module requirements for one or more modules to determine whether the simulated final performance characteristics (e.g., simulated cell efficiency) meet the expected product output under any of the adjusted module requirements. The factory control system can store the modeling results in the data store.

At block 511, the factory control system identifies a new module requirement for one or more modules based on the modeling results. For example, the factory control system identifies that a new module requirement for the emitter RS module is that the inline measurement for emitter RS should be between 60-65Ω instead of 55-65Ω.

At block 513, the factory control system causes a module to meet the new module requirements. The factory control system can send a message in real-time to a module controller indicating the new module requirement. The factory control system can cause a module, which is causing the performance characteristics of a final product to not meet the expected product output, to meet a new module requirement. Alternatively, the factory control system can provide feed forward data to an adjacent module to correct (compensate) for the module which is causing the problem.

At block 515, the process parameters and/or tool parameters are changed in real-time to achieve a new module requirement. Tool controllers can directly monitor tool parameters in real-time. In one embodiment, a final tester can collect the real-time tool parameter data from the tool controllers and store the data in a data store, which can be accessed by the factory control system. When the factory control system sends a message in real-time to a module controller indicating the new module requirement, the module controller causes a tool controller to adjust the tool parameters (e.g., temperature, pressure, flow rate, etc.) to achieve the new module requirement, according to one embodiment. For example, when $J_{SC}$ does not meet the expected factory value, the factory control system sends a message in real-time to the print quality module controller and the print quality module controller can cause a tool controller to change the print screen process in real-time to achieve the new module requirement. A module controller can access module algorithms to determine which process parameters and/or tool parameters are to be adjusted to achieve the new module requirement. For example, the factory control system sends a new module requirement to an emitter RS module controller in real-time that the inline measurement for emitter RS should be 60-65Ω instead of 55-65Ω. The emitter RS module controller can determine from module algorithms that a tool's temperature needs to be changed from 380 degrees to 385 degrees to achieve the new module requirement and causes a tool controller to change the temperature from 380 degrees to 385 degrees in real-time. In another embodiment, the factory control system can access module algorithms and automatically and dynamically communicate with a tool controller to adjust the process parameters and/or tool parameters to achieve the new module requirement at block 515.

It is important to note that for an output value requirement for each module (e.g., a module requirement 257 set by a factory control system 220 in FIG. 2) there can be a statistical variation due to, for example, tool processes, excursions, chamber state (e.g., how old is a consumable, such as screen for printing, quartz boat for emitter, chamber quality for passivation), etc. Thus, to achieve a desired target run to run, one or more processes need to be adjusted. FIG. 6 illustrates exemplary tool parameters being monitored and adjusted by a factory control system in real-time. The run to run control is developed for each tool. For example, a print quality tool controller can change squeegee pressure to try to maintain the same line width during the life of the screen for the same set target. Similarly, a tool controller can make slight adjustments in temperature and POCL/O2 gas flow to maintain a target emitter Rs. For passivation thickness and reflectivity index (RI), a tool controller can make slight tool parameters adjustments to have tighter control over the achieved result for each module requirement. To achieve a desired target run to run, the factory control system monitors actual product output (e.g., cell efficiency), actual factory parameter data (e.g., $J_{SC}$, $V_{OC}$, etc.), tool parameters, process parameters, module output, and in-line measurements in real-time. The factory control system adjusts tool parameters in real-time when the monitored data indicates final product performance characteristics need improvement.

Returning to FIG. 5, at block 517, the factory control system continues to monitor the subsequent final products being created for actual product output data. For example, three hours after the start of production, when a first final product (e.g., solar cell, solar wafer, solar thin film, display, LED) is produced, the final tester can test the final product (or first group of final product) for efficiency (e.g., cell efficiency), as well as other actual factory parameter data (e.g., $J_{SC}$, $V_{OC}$, etc.). The final tester can also have collected tool parameter data and in-line measurement data during the time the products (e.g., wafers) are being processed to create the final product(s). The factory control system can monitor the efficiency, tool parameter data, in-line measurement data, and factory parameter data and adjust process parameters and/or tool parameters in real-time to improve the final product performance characteristics. For instance, the factory control system may detect that cell efficiency for the final product is low and determine that the wafer life time lower limit was too low (e.g., 5 µs). Current wafers are still being processed using the 5 µs lower limit. The factory control system can cause a tool controller to adjust the tool parameters in real-time to change the lower limit to 7 µs. Once the change is made, current wafers will be processed using the 7 µs lower limit, and at block 517, the factory control system continues to monitor the subsequent final products being created using the 7 µs lower limit.

In another example, the factory control system can implement different processes in real-time. For example, the factory control system can determine that cell efficiency of the final product is low and cause the current wafers to be processed using a different process flow, such as extra gettering and an etch step at wafer quality to improve the life time measurements. In another example, the factory control system can detect that there are wafers with u-crack or lower thickness, as determined from the data gathered by the final tester, and cause the current wafers to be processed using a special handling flow to improve mechanical yield.

When the actual product output data for final product that are produced under new module requirement is available, the factory control system accesses the actual product output data (e.g., cell efficiency) at block 519. At block 521, the factory control system determines whether the actual product output data for the final product that is produced under new module requirement meets the expected product output. For example, the new final product that was manufactured under the new module requirement (e.g., emitter RS between 60-65Ω) has a cell efficiency of 17% which meets the expected product output. If the factory control system determines that the new final product has actual product output data that meets the expected product output (block 521), the factory control system can determine whether production is complete at block 523. If production is complete, the method 500 ends. If production is not complete, the factory control system can return to block 517 to continue monitoring for actual product output data for new final product.

If the factory control system determines that the new final product does not have actual product output data that meets the expected product output (block 521), the factory control system can return to block 505 to identify which factory parameters do not meet the expected factory parameters. In one embodiment, the factory control system evaluates a number of actual product output data using statistical analysis (e.g., an average) before the factory control system returns to block 505. Subsequently, the factory control system can determine and implement a new module requirement when actual product output data does not meet the expected product output. The factory control system is a system that can dynamically and automatically change module requirements, process parameter, tool parameters, etc., while a production line is in operation. In addition, the factory control algorithms can be updated. For example, a process engineer can modify the correlations in the factory control algorithm data.

Figure 7:
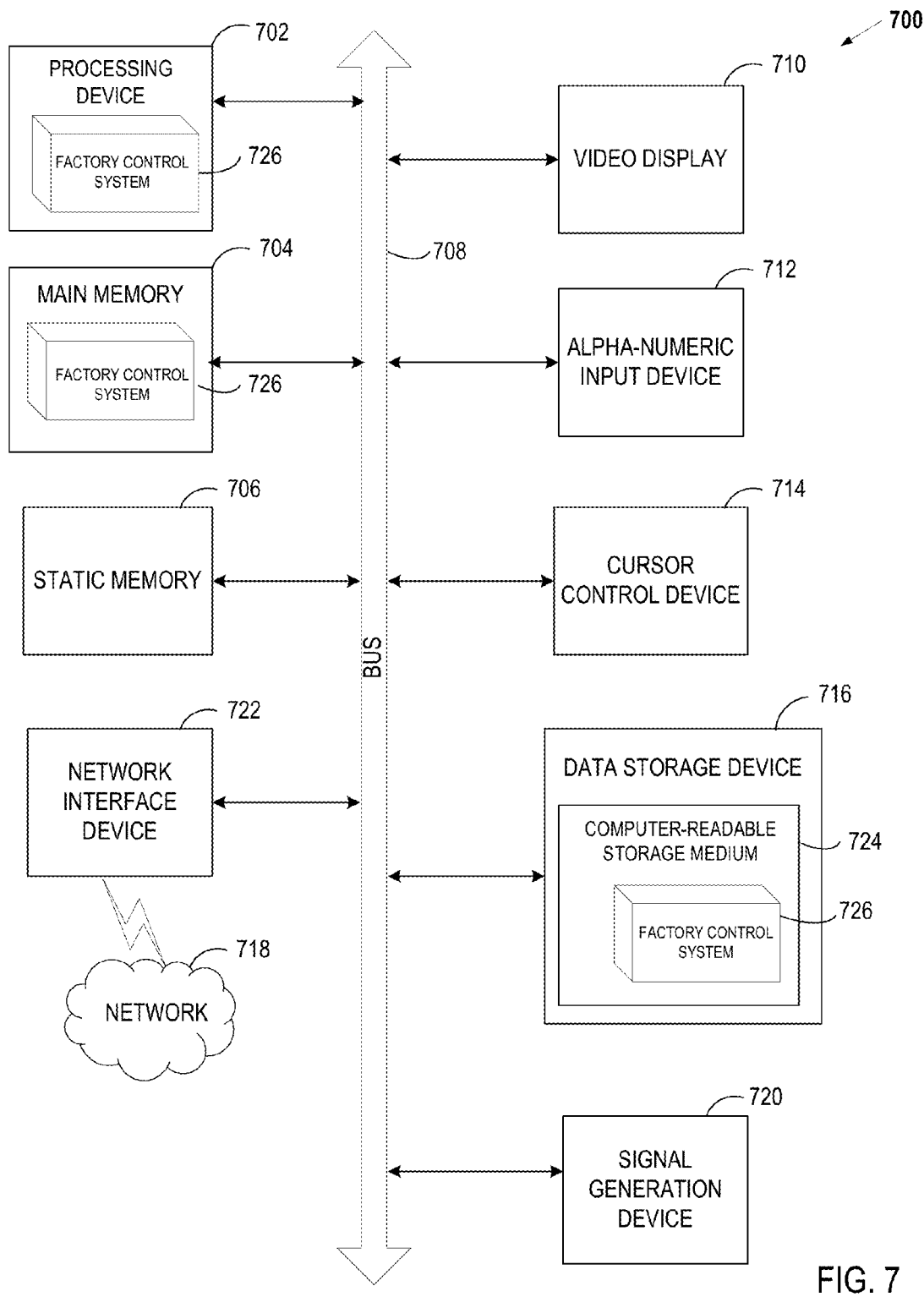
FIG. 7 illustrates an exemplary computer system.

FIG. 7 is a diagram of one embodiment of a computer system controlling creation of a product at a factory level. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the factory control system 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the factory control system 726) embodying any one or more of the methodologies or functions described herein. The factory control system 726 may also reside, completely or at least partially, within the main memory 704 and/or within the processing device 702 during execution thereof by the computer system 700, the main memory 704 and the processing device 702 also constituting machine-readable storage media. The factory control system 726 may further be transmitted or received over a network 718 via the network interface device 722.

The computer-readable storage medium 724 may also be used to store the factory control system 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The factory control system 726, components and other features described herein (for example in relation to FIG. 1) can be implemented as discrete hardware components or integrated in the functionality of hardware components such as ASICS, FPGAs, DSPs or similar devices. In addition, the factory control system 726 can be implemented as firmware or functional circuitry within hardware devices. Further, the factory control system 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "storing," "analyzing," notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for controlling production of a product at a factory level has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:

storing, by a factory control server including a processing device, module configuration data for a plurality of modules, wherein the plurality of modules comprises processes for producing a final product, and the plurality of modules has corresponding module requirements;

analyzing in real-time, by the factory control server, actual product output data that is generated by a final product tester after a factory produces at least one final product to determine whether the actual product output data meets an expected product output;

analyzing, by the factory control server, actual module data in real-time to determine a new module requirement to cause new actual product output data for a subsequent final product to meet the expected product output in response to a determination that the actual product output data does not meet the expected product output; and notifying, by the factory control server, a module controller in real-time of the new module requirement, wherein the module controller changes parameters in real-time to manufacture the subsequent final product using the new module requirement.

2. The computer-implemented method of claim 1, wherein determining a new module requirement to cause new actual product output data for a subsequent final product to meet the expected product output comprises determining whether the actual product output data falls within a range of or matches the expected product output.

3. The computer-implemented method of claim 1, wherein determining a new module requirement to cause new actual product output data for a subsequent final product to meet the expected product output comprises:
   determining an actual factory parameter that does not meet an expected factory parameter;
   identifying a module to evaluate based on a factory control algorithm and the determined actual factory parameter.

4. The computer-implemented method of claim 3, further comprising:
   modeling performance of the identified module to predict a final performance characteristic of a simulated final product; and
   identifying the new module requirement based on the results of the modeling.

5. The computer-implemented method of claim 1, wherein determining a new module requirement to cause new actual product output data for a subsequent final product to meet the expected product output further comprises accessing actual product output data.

6. The computer-implemented method of claim 1, wherein the factory produces one of a solar cell, a solar wafer, a solar thin film, a display, and a light-emitting diode.

7. A non-transitory computer-readable memory medium embodied with executable code that cause a processor to perform operations comprising:
   storing module configuration data for a plurality of modules, wherein the plurality of modules comprises processes for producing a final product, and the plurality of modules has corresponding module requirements;
   analyzing in real-time actual product output data that is generated by a final product tester after a factory produces at least one final product to determine whether the actual product output data meets an expected product output;
   analyzing actual module data in real-time to determine a new module requirement to cause new actual product output data for a subsequent final product to meet the expected product output in response to a determination that the actual product output data does not meet the expected product output; and
   notifying a module controller in real-time of the new module requirement, wherein the module controller changes parameters in real-time to manufacture the subsequent final product using the new module requirement.

8. The non-transitory computer-readable memory medium of claim 7, wherein determining a new module requirement to cause new actual product output data for a subsequent final product to meet the expected product output comprises determining whether the actual product output data falls within a range of or matches the expected product output.

9. The non-transitory computer-readable memory medium of claim 7, wherein determining a new module requirement to cause new actual product output data for a subsequent final product to meet the expected product output comprises:
   determining an actual factory parameter that does not meet an expected factory parameter; and
   identifying a module to evaluate based on a factory control algorithm and the determined actual factory parameter.

10. The non-transitory computer-readable memory medium of claim 9, wherein the operations further comprise:
   modeling performance of the identified module to predict a final performance characteristic of a simulated final product; and
   identifying the new module requirement based on the results of the modeling.

11. The non-transitory computer-readable memory medium of claim 7, wherein determining a new module requirement to cause new actual product output data for a subsequent final product to meet the expected product output further comprises accessing actual product output data.

12. The non-transitory computer-readable memory medium of claim 7, wherein the factory produces one of a solar cell, a solar wafer, a solar thin film, a display, and a light-emitting diode.

13. A computerized system comprising:
   a processor coupled to a memory through a bus; and
   instructions executed from the memory by the processor to cause the processor to
      store module configuration data for a plurality of modules, wherein the plurality of modules comprises processes for producing a final product, and the plurality of modules has corresponding module requirements;
      analyze in real-time actual product output data that is generated by a final product tester after a factory produces at least one final product to determine whether the actual product output data meets an expected product output;
      analyze actual module data in real-time to determine a new module requirement to cause new actual product output data for a subsequent final product to meet the expected product output in response to a determination that the actual product output data does not meet the expected product output; and
      notify a module controller in real-time of the new module requirement, wherein the module controller changes parameters in real-time to manufacture the subsequent final product using the new module requirement.

14. The computerized system of claim 13, wherein the instructions for determining a new module requirement to cause new actual product output data for a subsequent final product to meet the expected product output further cause the processor to determine whether the actual product output data falls within a range of or matches the expected product output.

15. The computerized system of claim 13, wherein the instructions for determining a new module requirement to cause new actual product output data for a subsequent final product to meet the expected product output further cause the processor to:
   determine an actual factory parameter that does not meet an expected factory parameter; and
   identify a module to evaluate based on a factory control algorithm and the determined actual factory parameter.

16. The computerized system of claim 15, wherein the instructions further cause the processor to:
  model performance of the identified module to predict a final performance characteristic of a simulated final product; and
  identify the new module requirement based on the results of the modeling.

17. The computerized system of claim 13, wherein the instructions for determining a new module requirement to cause new actual product output data for a subsequent final product to meet the expected product output further cause the processor to access actual product output data.

18. The computerized system of claim 13, wherein the factory produces one of a solar cell, a solar wafer, a solar thin film, a display, and a light-emitting diode.

* * * * *